United States Patent
Stamm et al.

(10) Patent No.: US 7,204,444 B2
(45) Date of Patent: Apr. 17, 2007

(54) MEDIA CARTRIDGE HAVING REEL SUSPENSION SYSTEM AND METHOD OF MANUFACTURE

(75) Inventors: Stephen J. Stamm, Fort Lupton, CO (US); Gregory P. Argys, Westminster, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 11/014,640

(22) Filed: Dec. 15, 2004

(65) Prior Publication Data
US 2006/0151651 A1 Jul. 13, 2006

(51) Int. Cl.
*G11B 23/04* (2006.01)

(52) U.S. Cl. .............. 242/338.1; 242/343; 242/345.2; 360/132

(58) Field of Classification Search ........... 242/338, 242/338.1, 343, 343.1, 343.2, 348; 360/132
See application file for complete search history.

(56) References Cited

U.S. PATENT DOCUMENTS

| | | | |
|---|---|---|---|
| 5,232,092 A | | 8/1993 | Chamberlin et al. |
| 5,413,220 A | | 5/1995 | Sirianni |
| 5,734,540 A | | 3/1998 | Jacobs et al. |
| 5,760,995 A | | 6/1998 | Heller et al. |
| 5,901,916 A | * | 5/1999 | McAllister et al. ......... 242/348 |
| 6,264,126 B1 | * | 7/2001 | Shima et al. ............... 242/343 |
| 6,435,451 B1 | | 8/2002 | Leonhardt |
| 6,452,747 B1 | * | 9/2002 | Johnson et al. ............ 360/132 |
| 6,452,748 B1 | * | 9/2002 | Shima et al. ............... 360/132 |
| 6,480,357 B1 | * | 11/2002 | Rambosek .................. 360/132 |
| 6,498,700 B2 | * | 12/2002 | Takahashi et al. |
| 6,563,671 B2 | * | 5/2003 | Morita et al. .............. 360/132 |
| 6,572,045 B2 | | 6/2003 | Blair et al. |
| 6,650,504 B2 | * | 11/2003 | Ridl .......................... 360/132 |
| 6,736,344 B2 | * | 5/2004 | Tsuyuki et al. .......... 242/338.1 |
| 6,745,968 B1 | * | 6/2004 | Schoettle et al. ........ 242/338.1 |
| 6,751,059 B2 | * | 6/2004 | Morita et al. .............. 360/132 |
| 6,818,674 B2 | * | 11/2004 | Sakata et al. |
| 6,929,207 B2 | * | 8/2005 | Aaron et al. ............ 242/338.1 |
| 2002/0125359 A1 | | 9/2002 | Blair et al. |
| 2002/0159191 A1 | | 10/2002 | Cripps et al. |
| 2003/0234307 A1 | | 12/2003 | Kuhar et al. |
| 2005/0092859 A1 | * | 5/2005 | Aaron et al. ............ 242/338.1 |

* cited by examiner

*Primary Examiner*—William A. Rivera
(74) *Attorney, Agent, or Firm*—Morrison & Foerster LLP (57) ABSTRACT

In one example of one aspect of the invention, a data storage cartridge is provided. The data storage cartridge includes a housing having at least one opening, a reel rotatably disposed within the housing and accessible through the opening, the reel capable of translating axially, a biasing member for biasing the reel toward the opening, and an absorbing member disposed between the reel and a portion of the housing opposite the opening. In one example, the absorbing member includes a spring constant value of greater than 30 ounces per inch. The absorbing member may be disposed to engage and dampen the motion of the reel when the reel is displaced beyond a desired distance.

25 Claims, 6 Drawing Sheets

MEDIA CARTRIDGE HAVING REEL SUSPENSION SYSTEM AND METHOD OF MANUFACTURE

BACKGROUND OF THE INVENTION

1. Field of the Invention

The invention relates generally to media storage devices, and more specifically to media cartridges for housing rotatable reels.

2. Description of the Related Art

Magnetic tape cartridges have been used to conveniently and efficiently store and handle magnetic recording media for tape drives. One type of tape cartridge consists of a substantially rectangular exterior cartridge housing and a single reel containing a magnetic tape positioned within the housing. The cartridge housing includes an upper housing section and a lower housing section which substantially enclose the magnetic tape, which includes a cartridge leader. The cartridge leader becomes exposed through an opening in the cartridge housing during insertion of the cartridge into the tape drive. The tape drive is then able to engage and retrieve the tape from the cartridge for recording and/or playback.

The reel includes a hub, one or more flanges, and a plurality of teeth that are exposed through an access opening in the lower housing section. A drive clutch on the tape drive engages the teeth in order to rotate the reel. Typically, a spring within the cartridge housing biases the reel toward the lower housing section. During engagement between the drive clutch and the teeth, the tape drive exerts a force against the reel, urging the reel toward the upper housing section, thereby partially compressing the spring to promote a secure engagement between the drive clutch and the reel. The tape drive then rotates the reel and guides the tape across a data transducer that reads data from and/or writes data to the tape. Although the reel can move generally longitudinally along the rotational axis, the reel can also move somewhat axially relative to the lower and upper housing sections to allow for drive tolerances.

While movement of the reel between upper housing section and lower housing section is typical during normal operation in a tape drive, it has been found that such movement presents problems during handling outside the tape drive. In particular, undesired movement of the reel within the housing may damage the magnetic tape which is wound thereon. For example, if the cartridge is dropped or otherwise jostled, axial or tilting movement of the reel within the cartridge housing may result in contact between the one or more flanges and the cartridge housing, which can cause contact between one or more flanges of the reel and the tape. Typically, the flanges are relatively thin and can deflect somewhat easily. Contact between the reel and interior of the housing is especially likely if the cartridge is dropped on its top shell, causing the reel to be displaced towards the top shell.

Current design preference among tape manufacturers is to develop tape that is thinner to increase storage capacity. As tape becomes thinner, however, the tape is more easily damaged. For example, the potential for tape edge damage is increased if the tape comes in contact with portions of the reel or housing. In addition to damaging the outside edge of the tape, winding phenomena which results in the uneven or staggered wrap (i.e. packslip, popped strand) of the tape onto the reel also renders the tape vulnerable to damage. For example, damage to the magnetic tape may result in incorrect data reading and/or writing, or lost data by the tape drive.

Accordingly, the need exists to provide a cartridge that reduces or inhibits damage to the tape and/or reel due to, for example, axial movement of the reel within the cartridge housing, for example, when the cartridge is dropped on its top shell (opposite the exposed teeth of the reel). Further, the need exists to provide a cost-effective, efficient method of manufacturing a media cartridge that promotes increased accuracy in reading and writing by the tape drive.

BRIEF SUMMARY OF THE INVENTION

In one example of one aspect of the invention, a storage media cartridge is provided. The storage media cartridge includes a housing having at least one opening, a reel rotatably disposed within the housing and accessible through the opening, the reel capable of translating axially. Further, a biasing member (e.g., a hub spring or the like) is included for biasing the reel toward the opening, and an absorbing member is included between the reel and a portion of the housing opposite the opening (e.g., the top shell of the housing). The absorbing member may be disposed to engage and dampen the reel within the cartridge housing when the reel is displaced axially toward the portion of the housing opposite the opening. The absorbing member may be disposed in a cylindrical protrusion from the housing or otherwise disposed to dampen motion of the reel. In one example, the absorbing member includes a spring constant value of greater than 30 ounces per inch.

In another example, a storage media cartridge includes a housing and a reel rotatably disposed within the housing, the reel having a hub and a flange. An absorbing member is coaxially aligned with at least a portion of the hub and disposed between the hub and a portion of the housing. The absorbing member may include a spring constant value of greater than 6.0 pounds per inch. The absorbing member may be fixed with respect to either the housing or the reel. The cartridge may further include a biasing member aligned with a portion of the hub to bias the reel within the housing.

According to another example of another aspect of the invention, a method for manufacturing a storage media cartridge is provided. In one example, the method includes rotatably mounting a reel within a cartridge housing, disposing a biasing member between the reel and a portion of the cartridge housing, and disposing an absorbing member between the reel and a portion of the cartridge housing. In one example, the biasing member and the absorbing member are coaxially aligned with the reel. Further, the absorbing member may have a spring constant value of greater than 6.0 pounds per inch.

The present invention is better understood upon consideration of the detailed description below in conjunction with the accompanying drawings and claims.

DETAILED DESCRIPTION OF THE INVENTION

The following description is presented to enable a person of ordinary skill in the art to make and use the various aspects and examples of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limiting to the examples described and shown, but is to be accorded the scope consistent with the appended claims.

The potential for cartridge or media damage, e.g., reel flange or tape edge damage, is generally a function of the magnitude of force and duration of vibrational forces experienced by the reel from a sudden shock or jolt to the cartridge. For example, reel flange or tape edge damage may occur if the cartridge is dropped to a hard surface such as a table top or floor. The potential for cartridge and media damage may be reduced by using a reel suspension system that dampens, e.g., reduces, the amplitude of force experienced by the reel and/or number of vibrations experienced by the reel from an abnormal shock or jolt to the cartridge housing.

In one example, a cartridge includes a reel rotatably disposed within a housing, the housing including at least one opening to access the reel (e.g., by a reel driver). A biasing member is positioned between the reel and a portion of the housing to bias the reel toward the opening. Additionally, a dampening or absorbing member (e.g., a spring, foam, or rubber material) is positioned between the reel and a portion of the housing. The absorbing member may include various materials or dimensions and in one example has a spring constant value, k, greater than 6.0 pounds per inch for a typical magnetic tape cartridge (but may vary depending on the expected drop height, mass of the cartridge, g level, and the like). The absorbing member may reduce the amplitude and duration of forces experienced by the reel during a collision of the cartridge, for example, when dropped. In one example, the absorbing member is disposed within a cylindrical protrusion on the interior surface of the cartridge housing such that the absorbing member contacts and compresses if the reel is displaced along its axis abnormally (e.g., greater than during normal use) towards the interior surface of the cartridge housing.

Figure 1:
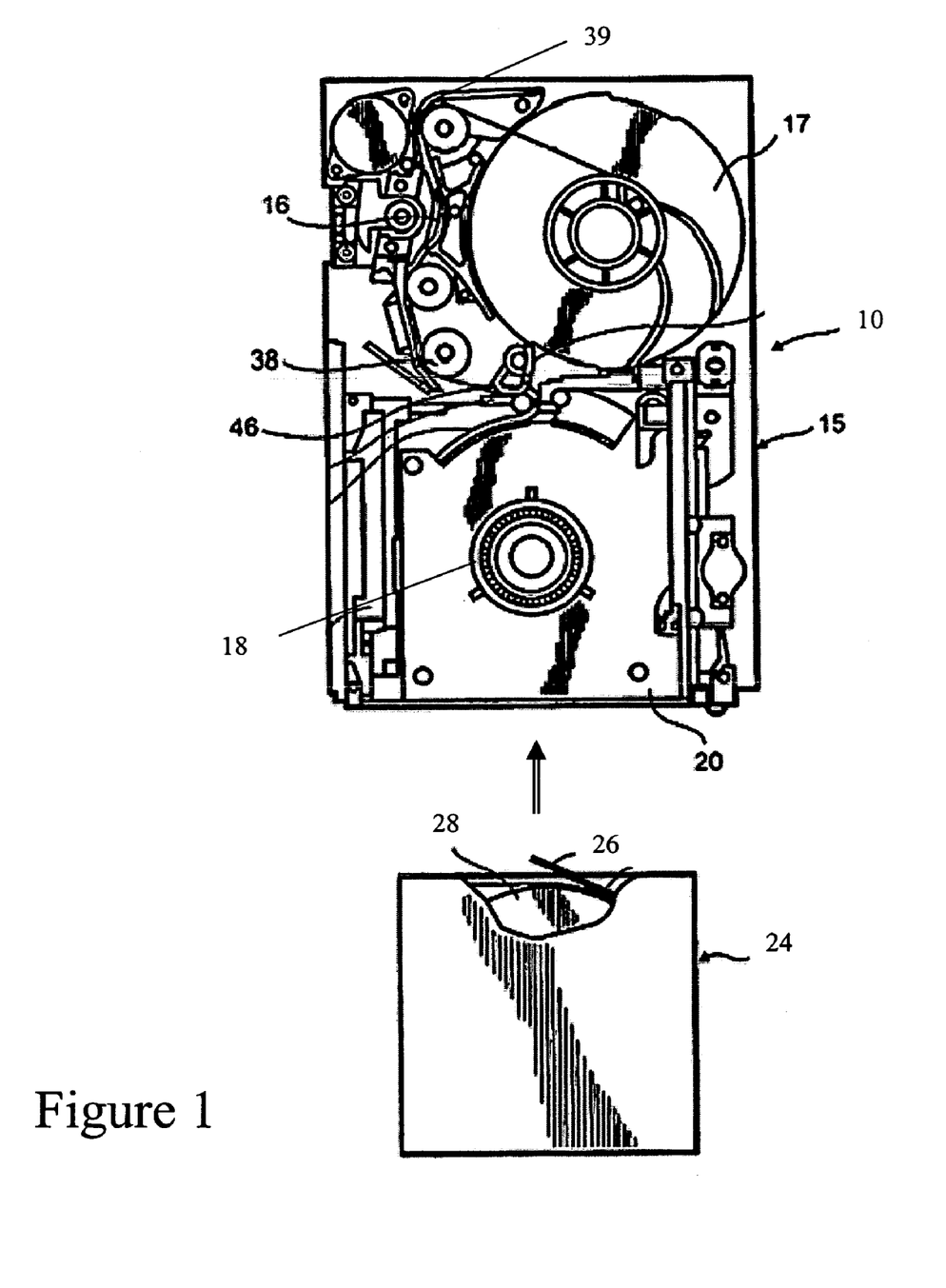
FIG. 1 illustrates a plan view of an exemplary magnetic tape drive and magnetic tape cartridge.

Referring initially to FIG. 1, tape drive 10 is illustrated that may be used with an exemplary cartridge 24 including an exemplary reel suspensions system to reduce the potential for media and/or cartridge damage. Tape drive 10 includes a tape drive housing 15, a data transducer, i.e., read and/or write head 16, a take-up reel 17, and a receiver 20. Tape drive 10 is used in conjunction with a cartridge 24 which houses storage tape on supply reel 28. Receiver slot 20 is configured to receive a suitable cartridge 24 therein adjacent reel driver 18. Tape drive 10 may also include a door and various mechanisms for receiving and ejecting cartridge 24. When cartridge 24 is received in receiver slot 20 a buckler motor 46 or the like may engage cartridge leader 26 and stream storage tape along a tape path within tape drive 10 passing read/write head 16 and onto take-up reel 17. The tape path may include various tape guides 39, rollers 38, one or more read/write heads 16, and the like before being wound upon take-up reel 17.

Tape drive 10 is typically installed within or associated with a computer (not shown) or computer network. Additionally, tape drive 10 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety.

Cartridge 24 generally includes a substantially rectangular cartridge housing which encloses cartridge reel 28 and storage tape wound thereon. Cartridge 24 may further include a cartridge door to protect storage tape therein and a cartridge leader 26, which is exposed when the door is open. Storage tape stores information in a form, e.g., digital, that may be subsequently retrieved if desired. Storage tape may be approximately one-half inch in width, but larger and smaller widths are contemplated, e.g., 4–8 mm. Storage tape may have a thickness of approximately 0.5 mils (0.0005 inch) or thinner. Typically, storage tape includes a storage surface on one side of storage tape that may be divided into a plurality of parallel tracks along the length of storage tape. Alternatively, the data may be recorded in diagonal strips across storage tape.

It should be understood that exemplary cartridges described herein may be used with various tape drives not explicitly shown or described. Additionally, various other features of a tape drive may be included, for example, various buckler systems, roller guides, tape guides, receiving mechanisms, dampers, and the like may be used.

Figure 2:
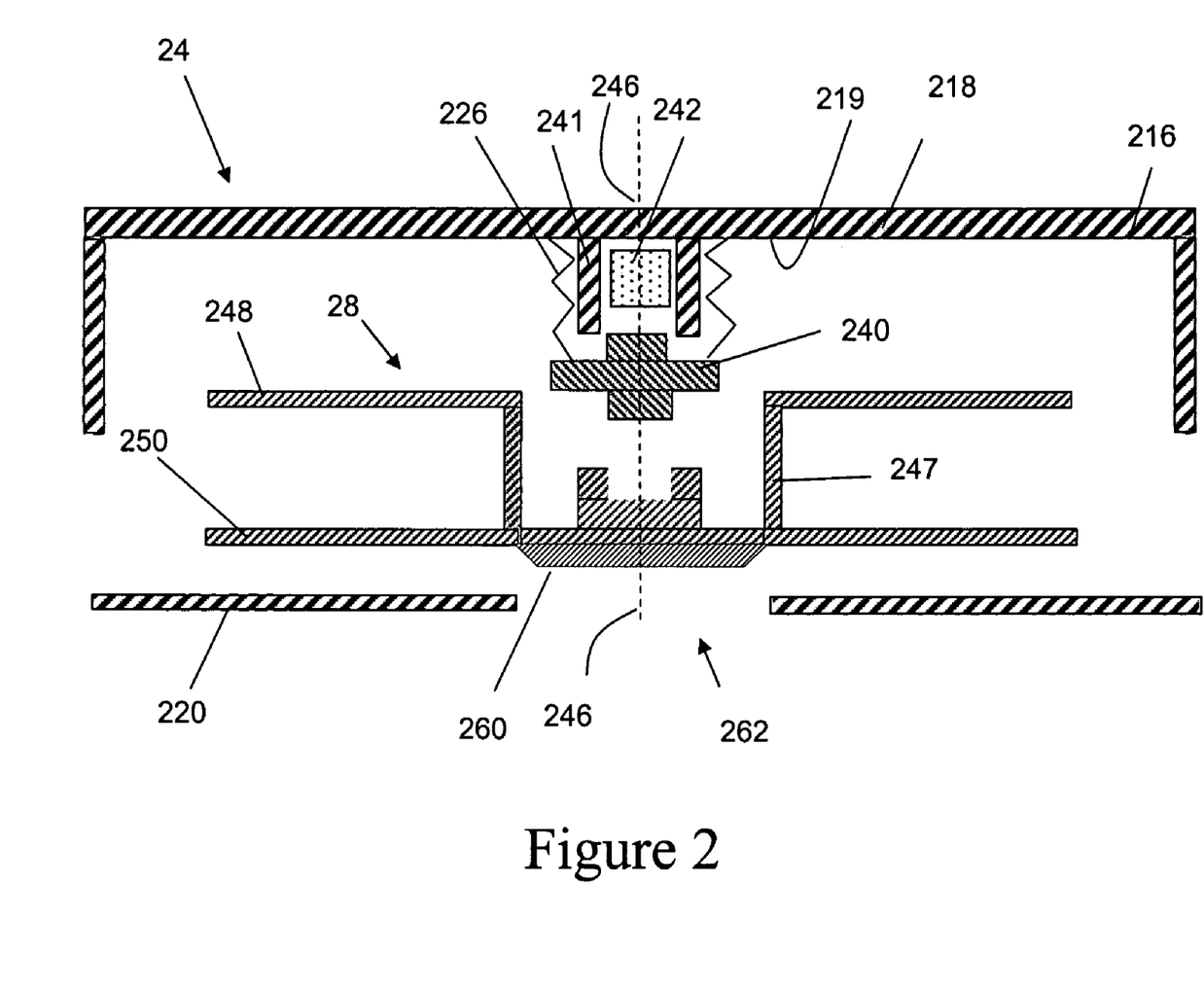
FIG. 2 illustrates an exploded cross-sectional view of an exemplary cartridge including a reel suspension system.
Figure 3:
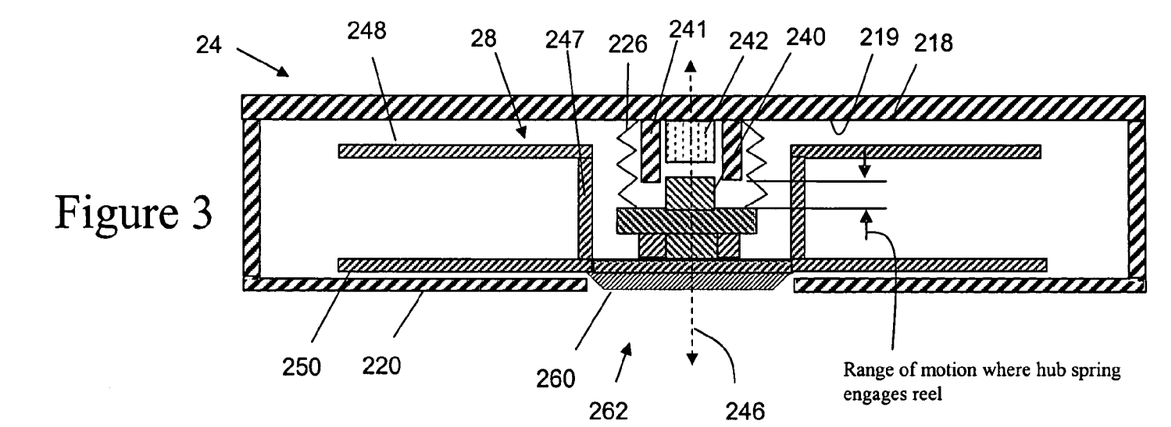
FIG. 3 illustrates a cross-sectional view of the exemplary cartridge of FIG. 2 during use within a drive.
Figure 4:
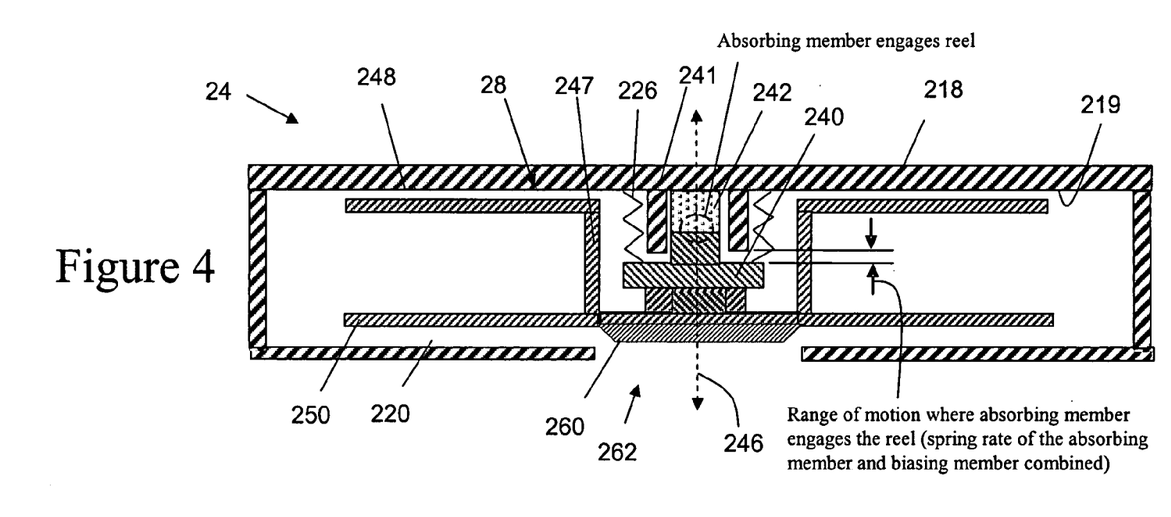
FIG. 4 illustrates a cross-sectional view of the exemplary cartridge of FIG. 2 while experiencing a large axial displacement of the reel within the cartridge housing.

FIGS. 2–4 illustrate various views of an exemplary cartridge 24. FIG. 2 illustrates an exploded cross-sectional view of cartridge 24, and FIGS. 3 and 4, illustrate cross-sectional views of cartridge 24 during normal use and experiencing a relatively large axial displacement of the reel respectively.

Cartridge 24 includes generally rectangular housing 216, which rotatably secures and protects reel 28 and storage tape wound thereon from damage and contaminants. The design of cartridge housing 216 can vary depending upon the design requirements of cartridge 24 and reel 28. Cartridge housing 216 may be made of any suitable material, for example plastic and the like. The cartridge housing preferably includes a rigid material to protect the enclosed reel 28 and magnetic tape. Suitable materials include metal, plastic, rubber, ceramics, and composites thereof. A particular example of a plastic commonly used for forming cartridge housings 216 is polycarbonate. Further, the cartridge housing may be manufactured by injection molding processes as are known in the art. Further, reel 28 may include any suitable material such as plastics, low friction metals, ceramics, and the like.

Cartridge housing 216 may be of any shape or dimension which permits reel 28 to be contained therein, and which allows cartridge 216 to appropriately fit into a corresponding tape drive. In this example, cartridge housing 216 is illustrated as generally box-shaped and contains reel 28; however, other shapes, including disc-shaped, elliptical, square, and triangular cartridge housings 216, which may contain one or more reels 28, are contemplated.

In this example, cartridge housing 216 includes an upper housing section 218 that includes an upper interior surface 219, a lower housing section 220, and a reel 28 adapted to have magnetic storage tape wound thereon (not shown). A biasing member 226 (sometimes referred to as a "hub spring") is included to bias reel 28 within housing 216. The interior surface 219 of cartridge 24 further includes a cylindrical protrusion 241, which includes a shock absorbing member 242.

Reel 28 rotates about a rotational axis 246 during winding or unwinding of storage tape. The design of reel 28 can be varied to suit the design requirements of the particular cartridge 24. In this example, reel 28 includes a hub 247, an upper flange 248, and a lower flange 250. A plurality of teeth 260 are included with hub 247 and exposed through an opening 262 of housing 216. Biasing member 226 exerts a force to bias reel 28 toward the lower housing section 220 of cartridge housing 216 and in particular opening 262. Opening 262 allows for the engagement of an external mechanism (e.g., reel driver 18 illustrated in FIG. 1) to cause rotation of reel 28. Additionally, biasing member 226 may bias reel 28 such that the lower flange 250 is substantially parallel to the lower interior surface of the lower housing section 220.

In this example, biasing member 226 includes a spring. One end of the spring rests against the upper housing section 218 of cartridge housing 216. The opposite end of the spring can be set against reel 28. Any sufficiently resilient material can be used for biasing member 226. Alternatively, other means of biasing reel 28 against the lower housing section 220, which are known to those skilled in the art, can be utilized. Biasing member 226 allows reel 28 to move axially within housing 216 to accommodate varying running heights of reel drivers in different drives (see, for example, FIG. 3). Biasing member 226 also supplies a biasing force to reel 28 against a reel driver of a tape drive to ensure proper engagement of teeth 262 and opposing teeth or members of a reel driver.

If cartridge 24 experiences a large axial force, for example, from being dropped on its major top or bottom surface, reel 28 may experience a large force and move relative to housing 216. For example, if cartridge 24 is dropped on the upper housing section 218, reel 28 (including flange 248) may translate axially (along rotational axis 246) and collide with portions of the upper interior surface 219. Conventional hub springs, used primarily for biasing reel 28 to a drive reel, typically have low k values (e.g., less than 30 ounces per inch) and may not prevent reel 28 from translating axially into upper interior surface 219 when experiencing relatively large forces, e.g., similar to being dropped from a height of 12 inches or more. Further, with biasing member 226 alone, shock and vibrational forces translated to reel 28 may reside for an undesirable length of time increasing the change of tape and reel damage or uneven tape wrap.

In this example, cartridge 24 includes a reel suspension system, which generally includes a shock absorbing member 242. Absorbing member 242 is disposed axially between the upper interior portion 219 of housing 216 and a portion of reel 28, in this example, a portion of hub 247. Accordingly, if cartridge 24 is dropped, for example, on the top surface 218 of housing 216, reel 28 translates axially toward upper interior surface 219. As reel 28 approaches interior surface 219, absorbing member 242 is engaged and compressed, thereby reducing the overall displacement of reel 28 within housing 216.

Although biasing member 226 may resist the displacement imparted to reel 28, absorbing member 242 having a greater spring constant than biasing member 226, will reduce the g-force amplitude and number of shock pulses imparted to reel 28 to a greater extent than biasing member 226 alone. By reducing the axial displacement and duration of vibrational forces on reel 28, the potential for damage to reel 28, flange 248, and storage media threon is decreased.

Thus, during normal operation as shown in FIG. 3, biasing member 226 is engaged with reel 28, thereby biasing reel 28 towards the opening 262 of cartridge housing 216 and against external drive mechanisms. Reel 28 may move axially within a desired range while engaging only biasing member 226 as shown. A large displacement of reel 28 towards the top surface 218 of housing 216, e.g., from being dropped, may cause reel 28 to further engage absorbing member 242 as illustrated in FIG. 4. Thus, in this example, absorbing member 242 is not engaged during normal operation of cartridge 24. Thus, cartridge 24 operates similarly to a conventional cartridge during use with a tape drive, for example. If reel 28 is sufficiently displaced towards the top surface 218, a portion of reel 28 or a portion coupled to reel 28 (in this example, spring plug 240) engages absorbing member 242. Thus, at a certain axial displacement reel 28 is biased by both biasing member 226 and absorbing member 242 to reduce displacement of reel 28 and dampen vibrations of reel 28.

Absorbing member 242 may include any material suitable for retarding the oscillations of reel 28, for example, when reel 28 is displaced sufficiently to engage absorbing member 242. For example, absorbing member 242 may include a spring (comprised of metal, plastic, etc.), foam, rubber, epoxy, combinations thereof, or other suitable structures or materials. In one example, absorbing member 242 has a spring constant value k of greater than 30 ounces per inch, in another example, greater than 50 ounces per inch, and in one example, about 6.0 pounds or more per inch. Those of skill in the art will recognize that the spring constant value may be varied depending on various factors such as design of the cartridge housing, reel, etc., as well as the amount of force desirably absorbed by absorbing member 242, e.g., based on the particular cartridge and expected drop height.

Additionally, in this example, a spring plug 240 is included between reel 28 and both biasing member 226 and absorbing member 242. Spring plug 240 provides a mechanical interface between reel 28 and biasing member 226. Spring plug further forms a piston type engagement with cylindrical portion 241 and engages absorbing member 242 with sufficient axial translation. Spring plug 240 may take various shapes depending on the particular design and configuration of reel 28, cartridge housing 216, biasing member 226, absorbing member 242, and the like. In other examples spring plug 240 may be formed integrally with reel 28, e.g., co-molded or fixedly attached to hub 247, or alternatively as a portion of housing 218.

In other examples, absorbing member 242 and/or biasing member 226 may be fixed, e.g., by adhesive, or held axially in relation to reel 28 without the necessity of cylindrical protrusion 241 or spring plug 240. Additionally, in one example, absorbing member 242 may be fixed with respect to reel 28, e.g., atop spring plug 240 or other portion of (or associated) with reel 28 such that as reel 28 moves axially upward, absorbing member 242 engages a structure associated with the cartridge housing.

Figure 5A:
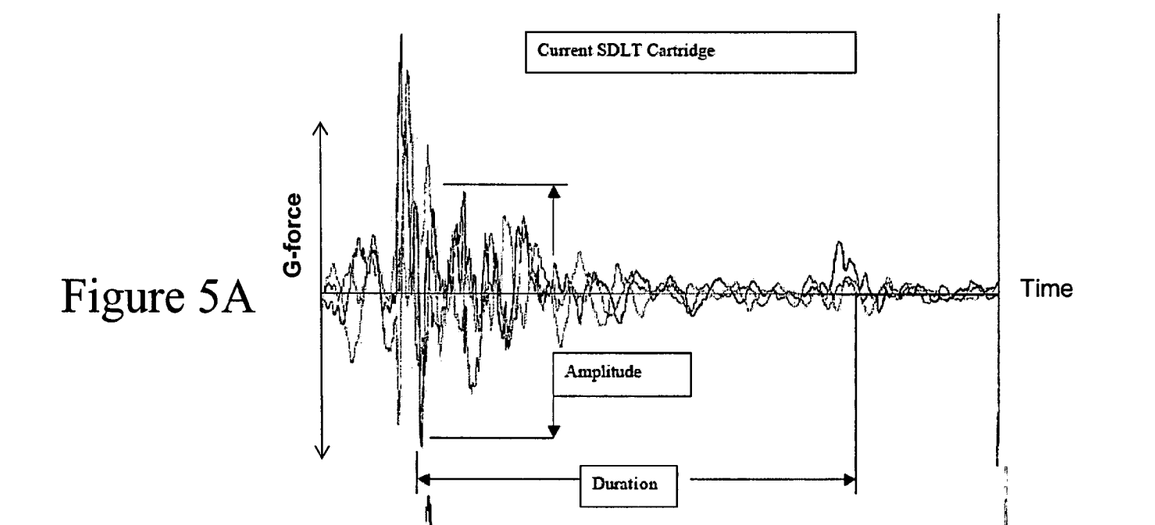
FIGS. 5A and 5B illustrate exemplary forces experienced by a reel within a cartridge during a sudden shock to the cartridge.
Figure 5B:
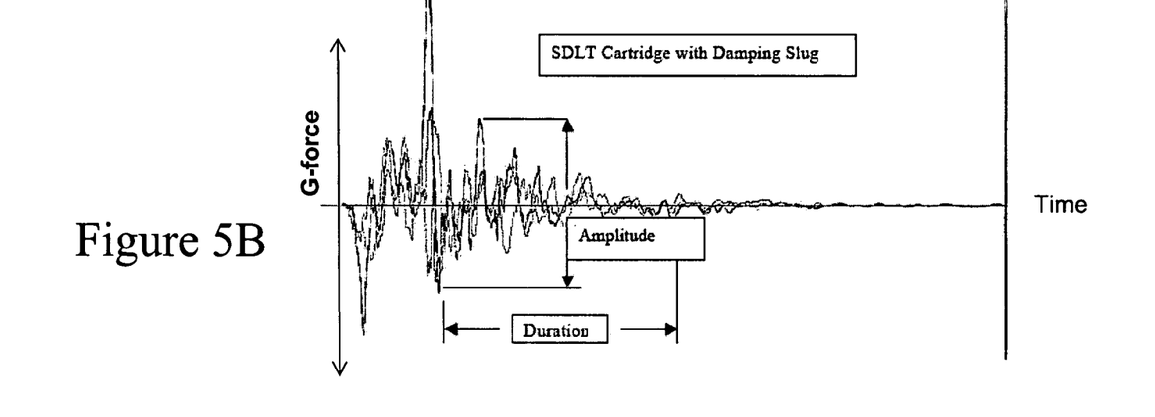

FIGS. 5A and 5B illustrate exemplary graphs of the g force level versus time as experienced by a reel of a cartridge during a sudden displacement. FIG. 5A shows the reel in a conventional SDLT cartridge when dropped on its top shell (opposite the opening exposing gear teeth) from a height of approximately 12 inches. FIG. 5B shows the reel of a conventional SDLT cartridge including an absorbing element and modified spring plug similar to that shown in FIGS. 2–4. As shown, both the g force amplitude and shock pulses experienced by the reel are reduced with the inclusion of an absorbing member.

Figure 6:
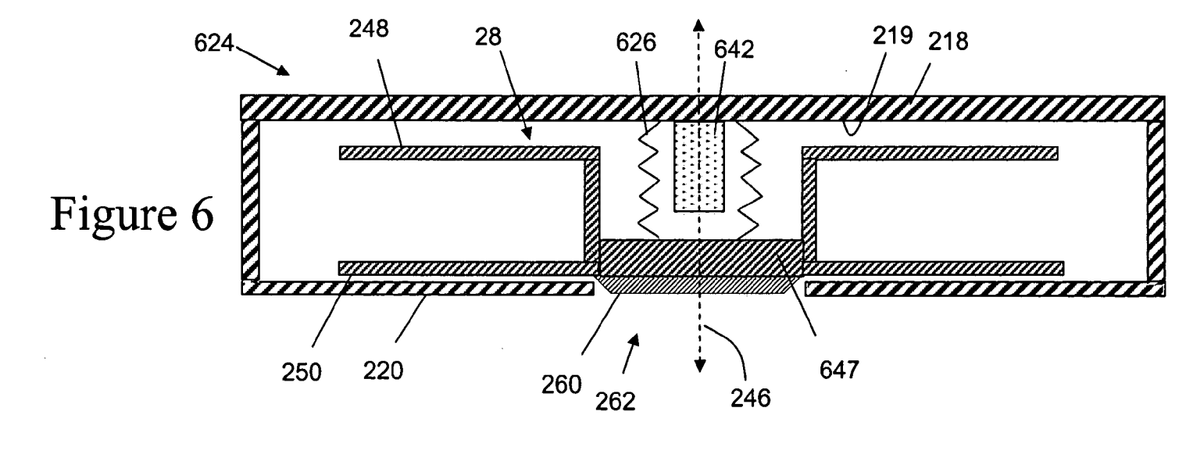
FIG. 6 illustrates a cross-sectional view of an exemplary cartridge.

FIG. 6 illustrates a cross-sectional view of another exemplary cartridge 624 including a shock absorbing member 642. Cartridge 624 is similar to cartridge 24 shown in FIG. 2 and described herein; accordingly, only differences will be discussed in detail. In this example, absorbing member 642 is placed between the upper interior surface 219 and a portion of hub 647. Absorbing member 642 will engage reel 28 as reel 28 moves towards interior surface 219. Absorbing member 642 may be placed adjacent biasing member 226. In one example, biasing member 626 includes a conventional hub spring and absorbing member 642 is fixed with respect to cartridge housing 218. Absorbing member 642 may include a suitable material affixed with an adhesive or otherwise attached to a portion of upper interior surface 219. Additionally, in another example, absorbing member 642 may be attached or fixed with respect to hub 647 and positioned to engage a portion of housing 218 as reel 28 translates axially.

Figure 7:
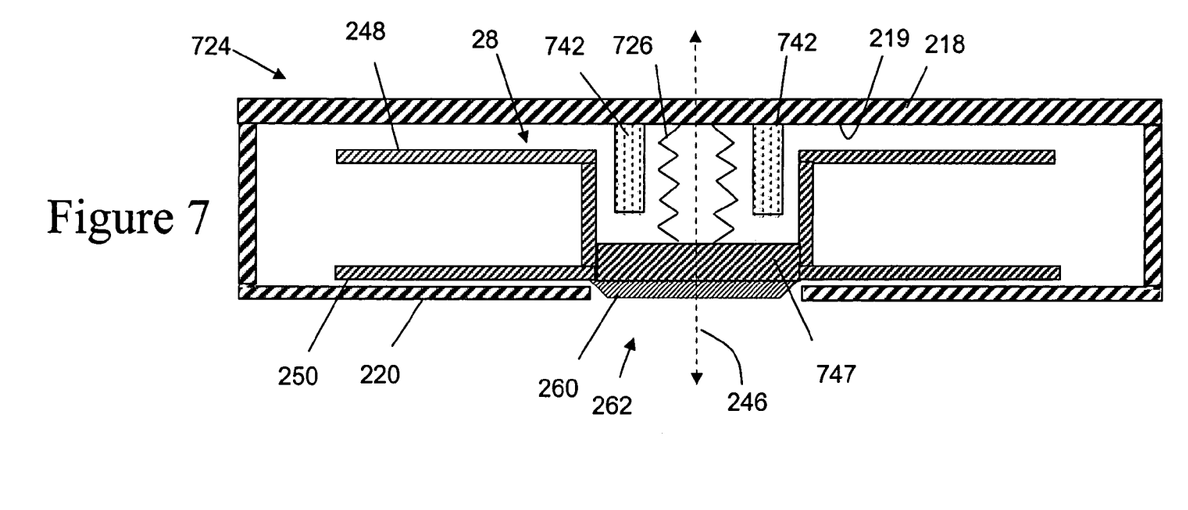
FIG. 7 illustrates a cross-sectional view of an exemplary cartridge.

FIG. 7 illustrates a cross-sectional view of another exemplary cartridge 724 including a shock absorbing member 742. Cartridge 724 is similar to cartridge 24 shown in FIG. 2 and described herein; accordingly, only differences will be discussed in detail. In this example, absorbing member 742 includes one or more members disposed radially around biasing member 726. For example, absorbing member 742 may include a cylinder of absorbing material around biasing member 726 and coaxially aligned with reel 28 and hub 747.

Figure 8:
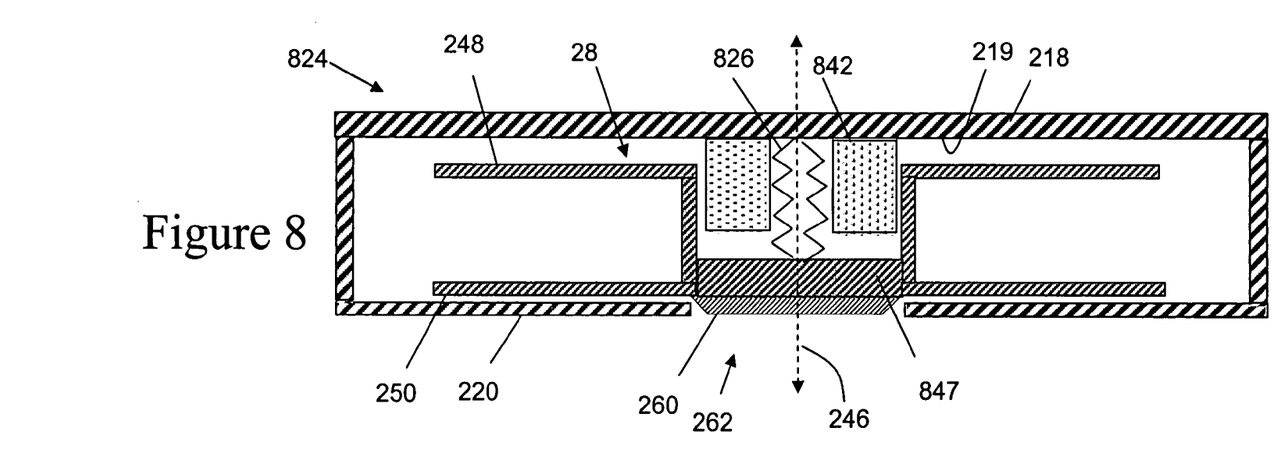
FIG. 8 illustrates a cross-sectional view of an exemplary cartridge.

FIG. 8 illustrates a cross-sectional view of another exemplary cartridge 824 including a shock absorbing member 842. Cartridge 824 is similar to cartridge 24 shown in FIG. 2 and described herein; accordingly, only differences will be discussed in detail. In this example, absorbing member 842 includes one or more members disposed radially around biasing member 826. For example, absorbing member 842 may include a cylinder of absorbing material around biasing member 826 and coaxially aligned with reel 28 and hub 847.

Figure 9:
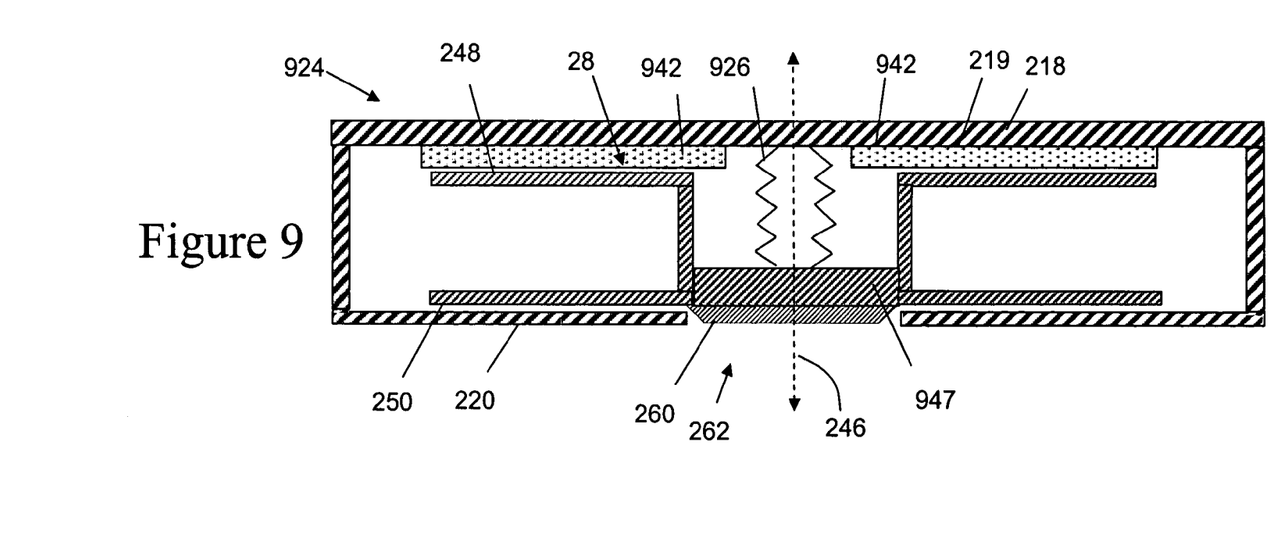
FIG. 9 illustrates a cross-sectional view of an exemplary cartridge.

FIG. 9 illustrates a cross-sectional view of another exemplary cartridge 924 including a shock absorbing member 942. Cartridge 924 is similar to cartridge 24 shown in FIG. 2 and described herein; accordingly, only differences will be discussed in detail. In this example, absorbing member 942 includes one or more members disposed on the interior surface 219 of cartridge housing 218 and aligned with reel 28. Absorbing member 942 may include a disk or layer of absorbing material with an opening around biasing member 926 and coaxially aligned with reel 28 or multiple elements disposed around biasing member 926 and coaxially aligned with reel 28. In other examples, biasing member 926 may cover the entire interior surface 219 or varying portions thereof and hub 947.

The above detailed description is provided to illustrate various examples and is not intended to be limiting. It will be apparent to those skilled in the art that numerous modification and variations within the scope of the present invention are possible. For example, various examples describes herein may be combined and altered. Further, numerous other materials and processes not explicitly described herein may be used within the scope of the exemplary cartridges and reel suspension systems described as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A storage media cartridge, comprising:
   a housing having an opening;
   a reel rotatably disposed within the housing and accessible through the opening, the reel capable of translating axially;
   a biasing member for biasing the reel axially toward the opening; and
   an absorbing member disposed between the reel and a portion of the housing opposite the opening, wherein the absorbing member is positioned to dampen movement of the reel, wherein the absorbing member has a spring constant value greater than 30 ounces per inch.

2. The storage media cartridge of claim 1, wherein the absorbing member has a spring constant value greater than 50 ounces per inch.

3. The storage media cartridge of claim 1, wherein the absorbing member has a spring constant greater than the biasing member.

4. The storage media cartridge of claim 1, wherein the absorbing member comprises a foam rubber material.

5. The storage media cartridge of claim 1, wherein the absorbing member is spatially fixed with respect to the cartridge housing.

6. The storage media cartridge of claim 1, wherein the absorbing member is disposed on a portion of an interior surface of the cartridge housing and at least partially aligned axially with a hub portion and flange portion of the reel.

7. The storage media cartridge of claim 1, wherein the absorbing member is spatially fixed with respect to the reel.

8. The storage media cartridge of claim 1, wherein the housing includes a cylindrical protrusion on the inside of the housing and the absorbing member is positioned at least partially within the cylindrical protrusion.

9. The storage media cartridge of claim 1, wherein the biasing member and the absorbing member are coaxially aligned with the reel.

10. The storage media cartridge of claim 1, wherein the biasing member straddles at least a portion of the absorbing member.

11. A storage media cartridge, comprising:
    a housing having an opening;
    a reel rotatably disposed within the housing and accessible through the opening, the reel capable of translating axially; and
    an absorbing member coaxially aligned with the reel and disposed between the reel and a portion of the housing for dampening movement of the reel, wherein the absorbing member has a spring constant value greater than 30 ounces per inch.

12. The storage media cartridge of claim 10, further comprising a biasing member biasing the reel toward an opening within the housing.

13. The storage media cartridge of claim 10, wherein the absorbing member has a spring constant value greater than 50 ounces per inch.

14. The storage media cartridge of claim 10, wherein the absorbing member comprises a foam rubber material.

15. The storage media cartridge of claim 10, wherein the absorbing member is spatially fixed with respect to the cartridge housing.

16. The storage media cartridge of claim 10, wherein the absorbing member is spatially fixed with respect to the reel.

17. The storage media cartridge of claim 10, wherein the housing includes a cylindrical protrusion on the inside of the housing and the absorbing member is positioned at least partially within the cylindrical protrusion.

18. A method for disposing a reel within a cartridge housing, comprising,
   rotatably mounting a reel within a cartridge housing, the reel capable of translating axially; and
   disposing an absorbing member between the reel and a portion of the cartridge housing, wherein the absorbing member has a spring constant value greater than 30 ounces per inch.

19. The method of claim 18, wherein the reel and the absorbing member are coaxially aligned.

20. The method of claim 18, further including disposing a biasing member for biasing the reel toward an opening within the housing.

21. The method of claim 18, wherein the absorbing member has a spring constant value greater than 50 ounces per inch.

22. The method of claim 18, wherein the absorbing member comprises a foam rubber material.

23. The method of claim 18, wherein the absorbing member is spatially fixed with respect to the cartridge housing.

24. The method of claim 18, wherein the absorbing member is spatially fixed with respect to the reel.

25. The method of claim 18, wherein the housing includes a cylindrical protrusion on the inside of the housing and the absorbing member is positioned at least partially within the cylindrical protrusion.

* * * * *